(12) United States Patent
Zbinden

(10) Patent No.: US 6,905,354 B1
(45) Date of Patent: Jun. 14, 2005

(54) U-CLIP FOR OPTICAL DEVICE ALIGNMENT

(75) Inventor: Eric J. Zbinden, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/733,182

(22) Filed: Dec. 10, 2003

(51) Int. Cl.$^7$ ................................................. G02B 6/00
(52) U.S. Cl. .................... 439/137; 439/136; 439/138; 439/139
(58) Field of Search .............................. 385/136, 147, 385/92, 139, 138

(56) References Cited

U.S. PATENT DOCUMENTS

| | | | | |
|---|---|---|---|---|
| 5,100,221 A | * | 3/1992 | Carney et al. | ............... 385/135 |
| 5,231,685 A | * | 7/1993 | Hanzawa et al. | ............. 385/84 |
| 5,386,487 A | * | 1/1995 | Briggs et al. | ................. 385/59 |
| 5,619,609 A | | 4/1997 | Pan et al. | |
| 6,720,582 B2 | * | 4/2004 | Miyokawa et al. | ........... 257/98 |

* cited by examiner

*Primary Examiner*—Chandrika Prasad
(74) *Attorney, Agent, or Firm*—Kevin A. Reif

(57) ABSTRACT

Alignment of optical components to one another in 3-degrees of freedom is facilitated by a U-clip and a sleeve having an off-axis optical component running there through. A generally U-shaped clip comprises a base a first arm and a second arm to form a channel. A generally cylindrical sleeve fits within the channel with a fiber or other optical component encased in the sleeve and positioned off center relative to a mechanical axis of the sleeve. Fine alignment adjustments may be made by sliding and rotating the sleeve within the channel.

20 Claims, 5 Drawing Sheets

U-CLIP FOR OPTICAL DEVICE ALIGNMENT

FIELD OF THE INVENTION

Embodiments of the present invention relate to optical packaging and, more particularly, to methods and apparatuses for facilitating precision alignment between various optoelectronic components.

BACKGROUND INFORMATION

Wavelength division multiplexing (WDM) is a technique used to transmit multiple channels of data simultaneously over the same optic fiber. At a transmitter end, data channels having different wavelengths or, colors if you will, are combined, or multiplexed together into a single fiber. The fiber can simultaneously carry multiple channels in this manner. Before being multiplexed into a single fiber, each one of these data channel requires its own laser which must be coupled to an individual fiber. At a receiving end, these multiplexed channels are separated prior to demodulation using appropriate wavelength filtering techniques.

The need to transmit greater amounts of data over a fiber has led to so-called Dense Wavelength Division Multiplexing (DWDM). DWDM involves packing additional channels into a given wavelength range. The resultant narrower spacing between adjacent channels in DWDM systems demands precision wavelength accuracy from the transmitting laser diodes. Further, DWDM as well as single channel systems require tight mechanical tolerances and precision coupling between various components.

One of the major challenges in the optoelectronic assembly process is to couple light from one chip to another chip or waveguide. The light or optical signal must be focused through an optical system onto a receiving waveguide a few microns wide. Placement accuracy of the optical components required to achieve acceptable coupling are often in the sub-micron range. Active components such as laser diode, optical amplifier, photodiode and optical modulator, usually need to be rigidly mounted to a substrate to insure proper heat dissipation or provide acceptable electrical path to maintain integrity of the high frequency signal. Typical assembly process of a laser transmitter used in the optoelectronic communication field can be as follow:

First, the laser diode is mounted onto a substrate at a predefined position. The substrate will provide an effective thermal path to evacuate the heat load generated by the diode thus keeping it within operating temperature range. The placement accuracy of the diode will vary in function of the design requirements but suffice to say that the less stringent the accuracy requirement is, the easier and cheaper the assembly process will be.

The second step will be to attach the second component on the substrate. This component could be an optical fiber or a lens to collimate or focus the laser beam onto a receiving waveguide such as an optical fiber. Innacuracy in the laser diode position can be compensated by adjusting the position of this second component. The second components is then bonded or otherwise secured to a surface while being careful to keep the alignment.

Additional components can be further added to the assembly by repeating the second step. Each one of these steps can be done either passively; use some type of external feedback such as machine vision to adjust their positions relative to the previous components or; be done actively in which case the laser diode is powered and the signal strength and/or signal integrity is monitored during the alignment process.

Furthermore, the assembly needs to be reliable. That is, the finished assembly including the bonding must be stable under temperature cycling, aging, shock, vibration, and any other condition that the assembly may reasonably be expected to encounter. To further complicate matters, most assemblies include more than just two components which must all be aligned. Each additional component further adds to the challenge. It is very difficult to hold the alignment while making the bond. Often some shift or movement occurs between the components which, if greater than the maximum tolerances dictate, may render the component unworkable or at least seriously degrade performance.

For clarity a reference frame is defined where the z axis is parallel to the apparatus optical axis. The X axis is normal to the optical axis (z) and in the horizontal plane and finally the Y axis is normal to the plane formed by the X and Z axes.

Various fiber optic support devices have been devised to facilitate fiber optic alignment. For example, U.S. Pat. No. 5,619,609 by Pan discloses a clip for supporting an end of an optical fiber relative to a mount surface. A sleeve is disposed over the optical fiber adjacent to its end. The clip comprises a clip body with an upper and lower surface, with a flange disposed adjacent to the lower surface. The flange is affixable to the mount surface, and walls extend from the upper surface of the body to define a channel at which the clip is affixable about the sleeve. When the sleeve is affixed within the channel, the body rigidly couples the sleeve to the flange, thereby avoiding misalignment between the optical fiber and any optical device which is on or supported by the mount surface. It appears that y-direction alignment of the fiber may be accomplished by manipulation of the sleeve up and down within the clip and x direction alignment may be accomplished by sliding the clip relative to the mount surface. Finally the z alignment is accomplished by either sliding the ferrule in the clip or by sliding the clip on the mount surface along the optical axis. Once aligned, the clip may be secured to the mounting surface and the sleeve to the clip such as by soldering or laser spot welding.

While the above method may be advantageous, it requires handling two different components and also requires a two step alignment and attachment process.

DETAILED DESCRIPTION

Embodiments of the present invention relate to a device to facilitate alignment of optical components to one another in 3-degrees of freedom. Embodiments may generally comprise a U-clip and a sleeve having an off-axis fiber running there through.

Figure 1:
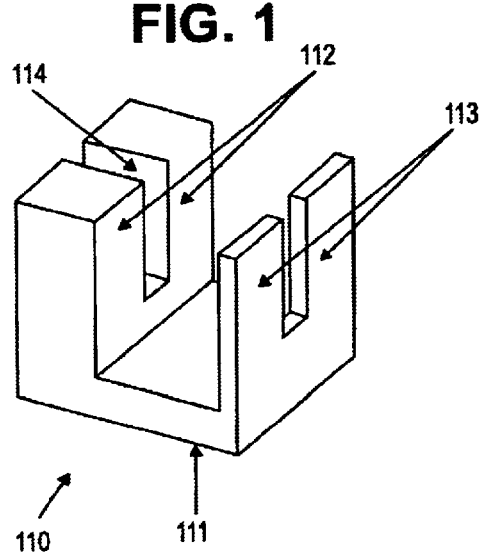
FIG. 1 is a diagram showing an improved U-clip according to one embodiment of the invention.
Figure 2:
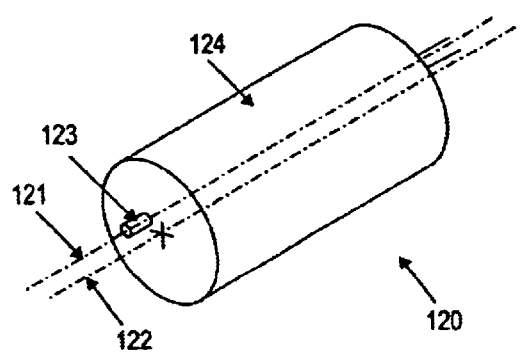
FIG. 2 is a diagram showing a sleeve with an off-axis fiber running there through to be fit within the U-clip shown in FIG. 1 according to one embodiment of the invention.
Figure 3:
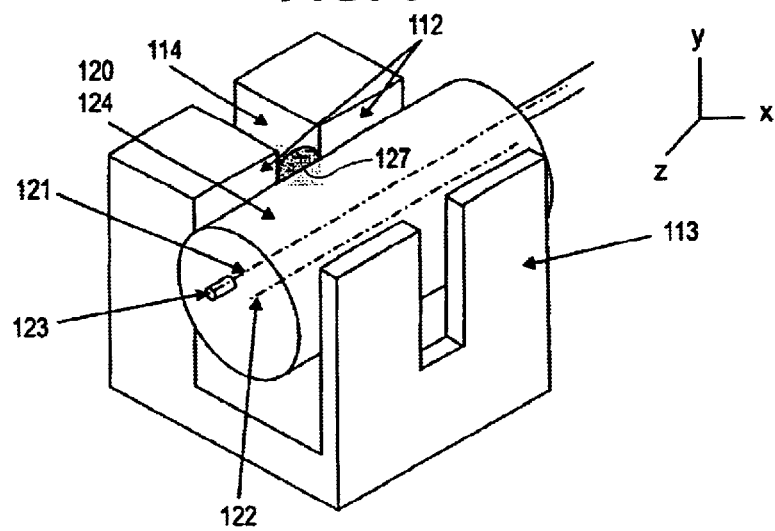
FIG. 3 is a diagram of the sleeve of FIG. 2 within the U-clip of FIG. 1 according to one embodiment of the invention.

Referring to FIG. 1, FIG. 2 and FIG. 3 together, a generally U-shaped clip 110 is shaped to accommodate a cylindrical sleeve 120 where the sleeve encases an optical component, such as the end of a fiber 123, at a point off-centered from its cylindrical axis. The U-clip 110 comprises a rigid L-shaped bracket comprising a base 111 and a first vertical arm 112. The bottom surface of the base 111 may be used to passively attach the U-clip 110 to a substrate (not shown) having other components attached thereto to be aligned with the optical element 123. The inner surface of the first vertical arm 112 may be an attachment surface for the sleeve 120. A second arm 113 of the U-clip 110 may also be generally perpendicular to the base 111 and may be flexible to provide a squeezing force on the sleeve 120 to provide contact between the sleeve 120 and surface 112 during the alignment and attachment process. A notch 114 in the first arm 112 may provide the appropriate geometry for a weld to attach the sleeve 120 in place relative to the U-clip 110 after alignment.

As best shown in FIG. 2, the cylindrical sleeve 120 may be designed so that the optical axis 121 of the optical element 123 (e.g. an optical fiber) is off centered relative to the cylinder mechanical axis 122 of the sleeve 120. The amount of off-centering between the optical axis 121 and mechanical axis 122 may be calculated to be slightly greater than the manufacturing alignment tolerance allowed for the passive placement of the U-clip 110 relative to an incoming optical beam. The amount of off-centering is a trade off between ajusment range and positioning accuracy. It can be optimized differently depending on the design requirement.

Referring to FIG. 3, the sleeve 120 fits inside of a channel in the U-clip 110 between the first vertical arm 112 and the second vertical arm 113. The alignment of the optical element 123 in the z direction may be accomplished by sliding the sleeve 120 forward and backwards within the clip 110. Alignment in the y-direction may be initially accomplished by moving the sleeve 120 up and down within the clip 110. In addition, fine adjustments in the x and y directions may be accomplished by rotating the sleeve 120 around its mechanical axis 122 which causes the optical axis of the fiber (123) to move along a cycloid having amplitude equal to twice the offset between the optical and mechanical axis. Once the optical element 123 is aligned, the sleeve 120 may be permanently attached to the clip 110, such as by a laser weld, solder, or epoxy 124 in notch 114.

Figure 4:
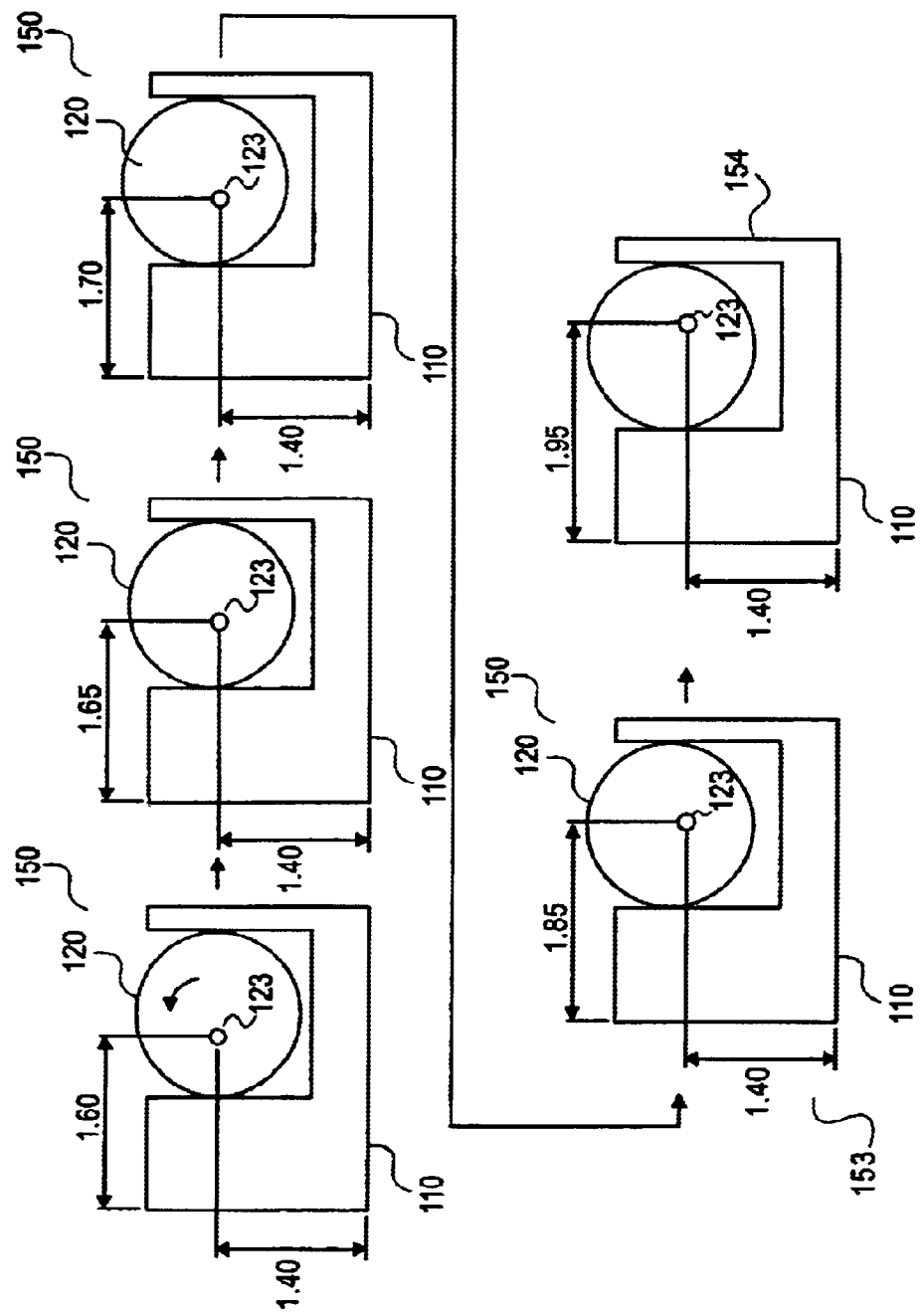
FIG. 4 is a diagram illustrating fine alignment adjustments in the x and y directions by rotating the sleeve within the U-clip according to one embodiment of the invention.

FIG. 4 illustrates fine adjustment in the x direction for a given y position. In each segment 150, 151, 152, 153, and 154, the sleeve 120 is rotated slightly in a counter-clockwise direction to change the x coordinates. In the example the sleeve is slided vertically in the U-clip to maintain the optical axis at the desired height or Y position. The height shown in this example is arbitrary and the Y position of the optical axis can be modified by sliding the sleeve vertically in the channel. The units in this example may be mm, however the same principle may apply regardless of scale. In segment 150, for example, the x coordinate is shown as 1.60 and the y coordinate as 1.40. In segment 151, the sleeve 120 is rotated counter-clockwise within the clip 110 and also slid upwards. Thus, x-coordinate has been adjusted to 1.65 and the y coordinate has remained the same at 1.40. Again, in segment 152 the sleeve has been rotated counter clockwise and lifted upward to keep the y coordinate at 1.40 and adjust the x-coordinate to 1.70. Segments 153 and 154 show similar adjustments with the y coordinate remaining at 1.40 and the x coordinate changing from 1.85 and 1.95, respectively.

Figure 5:
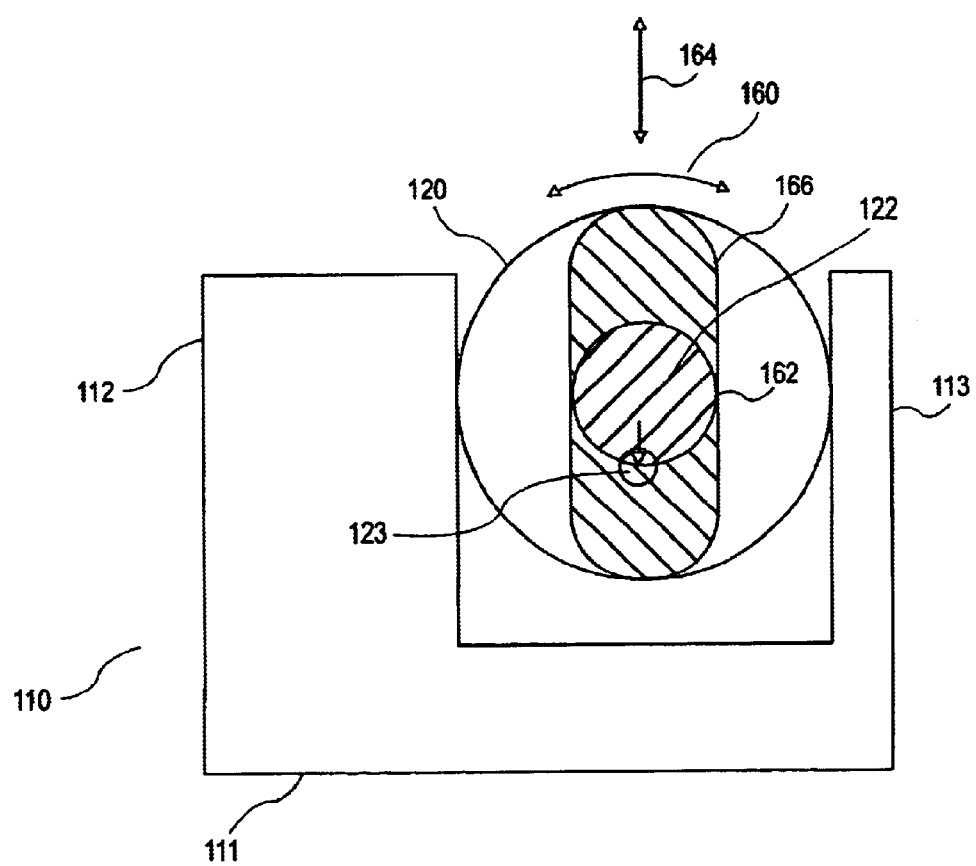
FIG. 5 is a diagram of the clip as shown in FIG. 3 having the sleeve affixed in place with the U-clip after alignment according to an embodiment of the invention.

FIG. 5 shows a front view of the clip 110 and sleeve 120. As shown, the sleeve 120 fits in the U-clip 110 between the first vertical arm 112 and the second vertical arm 113. The first vertical arm 112 may be rigid and the second vertical arm may be flexile to apply a slight force to the sleeve 120 to hold it in place during the alignment process. The optical fiber 123 is off center from the cylindrical axis 122 of the sleeve 120 by a distance r. When the sleeve 120 is rotated about the cylindrical axis 122, as illustrated by arrow 160, the optical fiber 123 may be aligned anywhere on the radius 162. By rotating 160 and moving the sleeve 120 up and down, as shown by arrow 164, the fiber 123 may be aligned to any point in the generally oblong area 166. Alignment adjustments in the x-direction may be made by initial placement of the clip base 111 on a substrate. Initial alignment in the y-direction may be made by sliding the clip up and down in the direction of arrow 164. Alignment in the z-direction may be made by sliding the sleeve 120 back and forth (into and out of the page). According to one embodiment of the invention, fine alignment adjustments in the x and y directions may be made by rotating the sleeve 120 in the direction of arrow 160.

Figure 6:
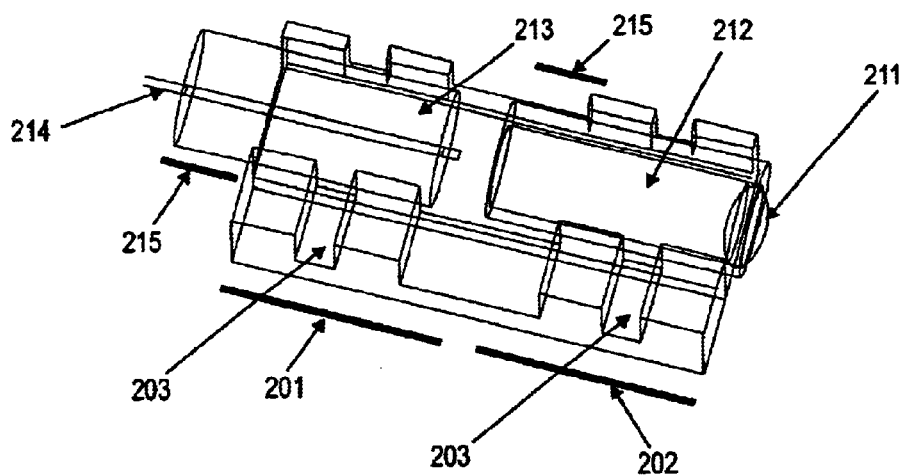
FIG. 6 is a U-clip for aligning and attaching multiple elements according to one embodiment of the invention.

FIG. 6 shows a U-clip designed to align and hold multiple optical components. This solution is particularly well suited for high volume manufacturing since it minimizes the number of parts to handle (only one sleeve to deal with) during the alignment process and maximizes the number of passive alignment (alignment of the U-clip and the laser diode) as passive alignments are generally cheaper than active ones. In this embodiment the U-clip 200 supports two sleeve-assemblies comprising a lens 211 which is held in a first sleeve 212 and a second sleeve 213 which holds a fiber 214. The U-clip has two sections 201 and 202 to hold the lens sleeve 212 and fiber sleeve 213 assemblies, respectively. A section at the back of each ferrule 215 may be designed to be gripped by the grabber tool of an automated alignment and welding station. Two grooves 203 provide a geometry for the attachment process such as by laser welding. In other embodiments other components such as an optical isolator could be embedded with the lens ferrule 212.

Figure 7:
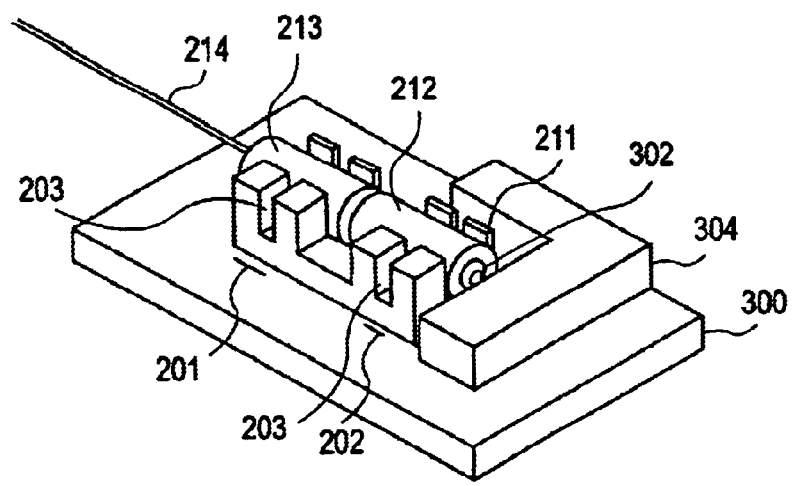
FIG. 7 is a diagram showing the U-Clip used in an optical laser module.

FIG. 7 shows an embodiment of the U-clip used to align components in an optical laser module. One skilled in the art will realize that numerous variations are possible. In this particular arrangement, a plurality of U-clips, 201 and 202, positioned in series on a common base is shown for aligning and holding two sleeves 212 and 213, as in FIG. 6, for aligning an optical fiber 214 and a lens 211. The U-clip is positioned on a laser module substrate 300. The sleeves 212 and 213 may be rotated, slid up and down, and back and forth within the clip assemblies to achieve optical alignment with the diode laser 302 mounted on a pedestal 304. Once optical alignment is achieved, the sleeves 212 and 213 may be permanently attached to their respective U-clips 201 and 202 by, for example, placing solder in grooves 203 or by laser spot welding.

Advantageously, the U-clip technology provides a standardized U-clip/sleeve geometry independent of the optical component which allows alignment and attachment of a variety of optical components on the same equipment. It requires only one active alignment and attachment step for a 3DOF alignment. As shown in the figures this design can be made extremely compact by designing a base that supports multiple optical components, the U-clip also permits the use of manufacturing equipment commonly referred to as quasi-planar and where all the assembly steps can be performed along a single axis and from a single direction. Sleeves and U-clips may be manufactured using dicing technology making it extremely attractive from a price standpoint. Further, by embedding the optical element into a sleeve mechanical stress caused by the alignment and attachment process are not transmitted to the optical elements as it is the case with some of the current technologies. This may be advantageous to maintain the fiber polarization extinction ratio. In addition, embodiments may also reduce the length of the focusing and fiber holding apparatus to less than 5 mm.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus, comprising:
   a generally U-shaped clip comprising a base, a first arm and a second arm to form a channel;
   a generally cylindrical sleeve to fit in said channel; and
   an optical component positioned off center relative to a mechanical axis of said cylindrical sleeve.

2. The apparatus as recited in claim 1 wherein said first arm is rigid and said second arm is flexible.

3. The apparatus as recited in claim 2 wherein said second arm squeezes said sleeve against said first arm.

4. The apparatus as recited in claim 1 wherein rotating said cylindrical sleeve about said mechanical axis within said channel alters x and y coordinates of said optical component.

5. The apparatus as recited in claim 4 wherein sliding said cylindrical sleeve up and down within said channel alters the y coordinates of said optical component.

6. The apparatus as recited in claim 4 wherein sliding said cylindrical sleeve within said channel alters the z coordinates of said optical component.

7. The apparatus as recited in claim 1 wherein said optical component comprises an optical fiber.

8. The apparatus as recited in claim 1 wherein said optical component comprises a lens.

9. The apparatus as recited in claim 1 further comprising:
   a plurality of U-shaped clips positioned in series on said base each comprising a first arm and a second arm.

10. The apparatus as recited in claim 1 further comprising:
    a notch in said first arm to solder, epoxy or weld said sleeve in place.

11. A method for aligning an optical component, comprising:
    positioning an optical component in a cylindrical sleeve a distance away from a mechanical axis of said cylindrical sleeve; and
    rotating said sleeve within a channel to adjust said optical component in a x direction and a y direction.

12. The method as recited in claim 11, further comprising:
    forming said channel with a generally U-shaped clip.

13. The method as recited in claim 11 further comprising:
    sliding said sleeve up and down with said channel to adjust said optical component in said y direction.

14. The method as recited in claim 11 further comprising:
    sliding said sleeve back and forth within said channel to adjust said optical component in a z direction.

15. The method as recited in claim 12 further comprising:
    affixing said sleeve to said clip.

16. A system for aligning optical components, comprising:
    a generally U-shaped clip comprising a base, a first arm and a second arm to form a channel;
    a generally cylindrical sleeve to fit in said channel;
    a first optical component positioned off center relative to a mechanical axis of said cylindrical sleeve;
    a second optical component, said first optical component aligned in translation along one degree-of-freedom with said second optical component by rotating said sleeve and aligned in translation along the two remaining degree-of-freedom by sliding said sleeve in said U shaped clip.

17. A system for aligning optical components as recited in claim 16, further comprising:
    a notch in one of said first arm and said second arm for securing said sleeve to said U-clip.

18. A system for aligning optical components as recited in claim 17, wherein said first optical component comprises an optical fiber.

19. A system for aligning optical components as recited in claim 18 wherein said second optical component comprises a laser diode.

20. A system for aligning optical components as recited in claim 16 wherein said second arm is flexible.

* * * * *